(12) United States Patent
Fynaardt

(10) Patent No.: US 11,706,207 B1
(45) Date of Patent: Jul. 18, 2023

(54) APPLICATION PROGRAMMING INTERFACE FOR CERTIFICATE MANAGEMENT SYSTEMS

(71) Applicant: INTEGRITY Security Services LLC, Santa Barbara, CA (US)

(72) Inventor: Daniel R. Fynaardt, Capistrano Beach, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

(21) Appl. No.: 18/057,968

(22) Filed: Nov. 22, 2022

(51) Int. Cl.
| | |
|---|---|
| H04L 29/06 | (2006.01) |
| H04L 29/08 | (2006.01) |
| H04L 9/40 | (2022.01) |
| G06F 9/54 | (2006.01) |
| H04L 9/32 | (2006.01) |
| H04L 9/08 | (2006.01) |

(52) U.S. Cl.
CPC .......... *H04L 63/0823* (2013.01); *G06F 9/547* (2013.01); *H04L 63/0884* (2013.01); *H04L 63/102* (2013.01); *H04L 9/088* (2013.01); *H04L 9/3263* (2013.01)

(58) Field of Classification Search
CPC ....... G06F 9/547; H04L 9/3263; H04L 9/088; H04L 63/102; H04L 63/0823; H04L 63/0844
See application file for complete search history.

(56) References Cited

U.S. PATENT DOCUMENTS 9,635,014 B2 * 4/2017 Venkataraman .... H04L 63/0815
2019/0356542 A1 * 11/2019 Chamarajnager ..... H04L 41/046

OTHER PUBLICATIONS

"Security Credential Management System"—Supporting SCMS Software Release 1.1, NHTSA, May 4, 2016 https://www.its.dot.gov/pilots/pdf/SCMS_POC_EE_Requirements.pdf (Year: 2016).*
"Identity and Credential Management in Vehicular Communication Systems"—Khodaei et al., Networked Systems Security Group, KTH Royal Institute of Technology, Jan. 4, 2017 https://arxiv.org/pdf/1601.00796.pdf (Year: 2017).*

* cited by examiner

*Primary Examiner* — Randy A Scott
(74) *Attorney, Agent, or Firm* — MH2 Technology Law Group LLP

(57) ABSTRACT

A system can include a certificate application programming interface (API) device that is operable to receive, via an application programming interface (API), an enrollment request for the at least one computerized device. The certificate API device can also generate, via the API, an enrollment package and an end entity certificate package for the at least one computerized device by obtaining the enrollment package and the end entity certificate package from a certificate management service (CMS). The certificate API device can also transmit, via the API, the enrollment package and the end entity certificate package to the at least one computerized device. The system can also include the CMS that is operable to provide the enrollment package and the end entity certificate package to the certificate API device.

30 Claims, 5 Drawing Sheets

APPLICATION PROGRAMMING INTERFACE FOR CERTIFICATE MANAGEMENT SYSTEMS

TECHNICAL FIELD

This disclosure relates generally to systems, devices, and methods for securely generating and providing certain types of digital assets such as security credentials and digital certificates. More particularly, the disclosure relates to improved systems, devices, and methods for providing an application programming interface that enables securely provisioning digital assets in computerized devices and reduces or eliminates delays in provisioning the digital assets in the computerized devices.

BACKGROUND

As computers have become miniaturized and commoditized, manufacturers are producing more varied devices that include any number of embedded computers and processors. The computer in a computerized device can control the device's operation; collect, store, and share data; communicate with other computers and other computerized devices; and update its own software, among other things.

The Internet of Things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" is uniquely identifiable through its embedded computing system, and is able to inter-operate within the existing Internet infrastructure. "Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

In many examples, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon and use the information received/sent from/to other vehicles in Vehicle-to-Vehicle (V2V; also known as Car-to-Car (C2C)) communications and/or from/to infrastructure elements in Vehicle-to-Infrastructure (V2I; also known as Car-to-Infrastructure (C2I)) communications for safe, correct, efficient, and reliable operation. Together, the V2V and V2I systems are commonly referred to as the V2X system or infrastructure. Specifically, if the entities involved in the communications are an electric vehicle and a charging station, this system is referred to as the Electric Vehicle to Grid (EV2G) system or infrastructure.

The computers in computerized devices operate according to their software and/or firmware and data. In order to ensure safe and proper operation, the computerized devices must be properly initialized and updated with the proper software, firmware, executable instructions, digital certificates (e.g., public key certificates), cryptographic keys, enrollment packages, pseudonym packages, and the like (hereinafter collectively referred to as "digital assets" or "software") as intended by the manufacturer, so that the IoT consists of devices that are executing authorized, known-to-be-good software and data. Problems arise, however, when unauthorized persons or organizations (e.g., hackers) replace or change the software in computerized devices.

An on board equipment (OBE) enrollment certificate is the equivalent of a passport for the OBE in that it uses the enrollment certificate to request other certificates—pseudonym and identification certificates. A certification process provides authorization for OBEs to interface with the secure certificate management service (SCMS) and request an enrollment certificate during the bootstrap process. Pseudonym certificates are short term and are used primarily for basic safety message authentication and misbehavior reporting. For privacy reasons, a device is given multiple certificates that are valid simultaneously, so that it can change them frequently. Identification certificates are used by OBEs primarily for authorization in V2I applications. An OBE has only one identification certificate valid at a time for a given application. Road side unit (RSU) enrollment certificates are equivalent to passports for the RSU in that it uses the enrollment certificate to request application certificates. A certification process provides authorization for RSUs to interface with the SCMS and request an enrollment certificate during the bootstrap process. Application certificates are used by an RSU to sign any over-the-air messages transmitted, such as signal phase and timing or traveler information messages. As there are no privacy constraints for RSUs, an RSU has only one application certificate valid at a time for a given application. Collectively, the certificates that are authorized by an enrollment certificate, including but not limited to, pseudonym, identification, and application certificates, are classified as end-entity certificates. End-entity certificates are the digital assets that authorize the participation in certain ecosystem, for example V2X, C2C, or EV2G. When describing any type of end-entity certificates or collections of end-entity certificates throughout this document, they will be referred to as end-entity certificates, end entity certificate packages, or end entity certificate bundles.

In conventional systems, computerized devices retrieve digital assets from an external server during the manufacturing process. Typically, conventional systems retrieve digital assets for each computerized device from the external server as each computerized device is provisioned. Any network connectivity issues can increase the time needed to provision a computerized device at a manufacturing facility. Additionally, conventional systems use synchronous provisioning techniques that can further increase the time needed to provision a computerized device.

The present techniques include improved systems, devices, and methods for providing an application programming interface that addresses the problems and drawbacks of conventional systems.

SUMMARY

As a matter of background, representational state transfer (REST) is an architecture style for designing networked applications that involves stateless transactions in a client-server configuration. RESTful applications use HTTP requests to post data (create and/or update), read data (e.g., make queries), and delete data. A certificate management service (CMS) is used for the enrollment and provisioning of on-board units (OBUs) and road side units (RSUs) for the USDOT vehicle to anything (V2X) infrastructure. IEEE 1609.2 is the standard that defines secure message formats and processing for use by Wireless Access in Vehicular Environments (WAVE) devices, including methods to secure WAVE management messages and methods to secure application messages. IEEE 609.2 also describes administrative functions necessary to support the core security functions. X.509 is the internationally accepted standard for public key infrastructure systems, used to manage digital certificates, public key encryption, and secure communications with the transport layer security (TLS) protocol. The system of the present teachings can support, for example, but not limited to, V2X, C2X (Euro std), and EV2G. The system creates an enrollment request and the REST API does enrollment and initial provisioning on behalf of device, including polling of the CMS to see if the certificates are ready. Group readiness for clients/end entity (EE) devices (e.g., OBUs of vehicles) can be determined, and the REST API enables management of a ledger of downloads (i.e., what certificates/enrollment and provisioning have been completed for a group of devices). In the present description, the term chips refers to any suitable hardware component within a computerized device to be provisioned such as an on-board unit, a road side unit, and the like. In some configurations, optional parameters for chips that do not include their own storage are stored in off-chip storage such as, but not limited to, flash storage, enabling enrollment and other certificates to be generated for chips without storage.

In some implementations, a system for securely provisioning at least one computerized device can include a certificate application programming interface (API) device that is communicatively connected to at least one computerized device via a first secure communication channel, and that is operable to receive a digital asset and to load the digital asset into at least one computerized device, the digital asset comprising an enrollment package and an end-entity certificate package. Secure communications, in the context of the present teachings, means an encrypted communications channel in which one or more of the communicating entities is authenticated to the other(s). In some examples, the certificate API device is operable to receive, via an application programming interface (API), an enrollment request for the at least one computerized device, wherein the enrollment request enables vehicle to vehicle or vehicle to infrastructure communications. The certificate API device can be used to generate, via the API, the enrollment package for the at least one computerized device by obtaining the enrollment package from a certificate management service (CMS), and be used to generate, via the API, an end entity certificate package for the at least one computerized device by obtaining the end entity certificate package from the CMS. Furthermore, the certificate API device can be used to transmit, via the API, the enrollment package and the end entity certificate package to the at least one computerized device, the enrollment package and the end entity certificate package to modify the at least one computerized device to enable exchanging secure communications with additional computerized devices. The system can also include the CMS that is connected via a second secure communication channel to the certificate API device, and that is operable to provide the enrollment package and the end entity certificate package to the certificate API device.

In some embodiments, the certificate API device can be used to receive, via the API, a request for a computerized device status for the at least one computerized device from the CMS. The certificate API device can also be used to transmit, via the API, a response to the request, the response comprising metadata indicating whether an enrollment package has been received from the CMS for the at least one computerized device. In some examples, the certificate API device is used to receive, via the API, a request for an enrollment status for a group of computerized devices from the CMS and transmit, via the API, a response to the request, the response comprising metadata indicating a number of enrollment certificates and end entity certificates received for the group of computerized devices.

In some embodiments, the enrollment request comprises a computerized device identifier corresponding to an externally accessible serial number for the at least one computerized device. In some examples, the at least one computerized device comprises an electronic control unit of an automobile. In various implementations, the certificate API device is used to receive and retrieve a wrapped or encrypted key for matching with the enrollment and application packages in response to detecting the at least one computerized device comprises volatile memory. In some embodiments, the certificate API device is used to transmit the wrapped key to the at least one computerized device. In some examples, the certificate API device is used to provide the enrollment package and the end entity certificate package to the at least one computerized device without a connection to an external network.

In some embodiments, the at least one computerized device is a road-side unit (RSU), and the certificate API device is operable to provide the enrollment package to the at least one computerized device without providing the pseudonym package. In some examples, the road-side unit is a street light sensor or a construction warning sensor. In some embodiments, the certificate API device is operable to generate the pseudonym package by bundling one or more pseudonym certificates retrieved from the CMS. In some examples, the certificate API device is operable to generate the enrollment package by bundling one or more enrollment certificates retrieved from the CMS.

In some embodiments, a method for securely provisioning at least one computerized device can include receiving, via an application programming interface (API), an enrollment request for the at least one computerized device, wherein the enrollment request enables vehicle to vehicle or vehicle to infrastructure communications. The method can also include generating, via the API, the enrollment package for the at least one computerized device by obtaining the enrollment package from a certificate management service (CMS) and generating, via the API, the end entity certificate package for the at least one computerized device by obtaining the end entity certificate package from the CMS. Furthermore, the method can include transmitting, via the API, the enrollment package and the end entity certificate package to the at least one computerized device, the enrollment package and the end entity certificate package to modify the at least one computerized device to enable exchanging secure communications with additional computerized devices.

In some embodiments, one or more non-transitory computer-readable media can include a plurality of computer-executable instructions that, in response to execution by a processor, cause the processor to receive, via an application programming interface (API), an enrollment request for at least one computerized device, wherein the enrollment request enables vehicle to vehicle or vehicle to infrastructure communications. The plurality of computer-executable instructions can also cause the processor to generate, via the API, the enrollment package for the at least one computerized device by obtaining the enrollment package from a certificate management service (CMS), the enrollment package comprising one or more enrollment certificates. Additionally, the plurality of computer-executable instructions can also cause the processor to generate, via the API, the end entity certificate package for the at least one computerized device by obtaining the end entity certificate package from the CMS, the end entity certificate package comprising one or more end entity certificates. Furthermore, the plurality of computer-executable instructions can also cause the processor to asynchronously transmit, via the API, the enrollment package and the end entity certificate package to the at least one computerized device, the enrollment package and the end entity certificate package to modify the at least one computerized device to enable exchanging secure communications with additional computerized devices.

BRIEF DESCRIPTION OF THE DRAWINGS

The accompanying drawings, which are incorporated into and constitute a part of this specification, illustrate examples of numerous features of the disclosed subject matter. The accompanying drawings, together with the description, serve to explain the principles of the various techniques described herein.

DETAILED DESCRIPTION

Figure 1:
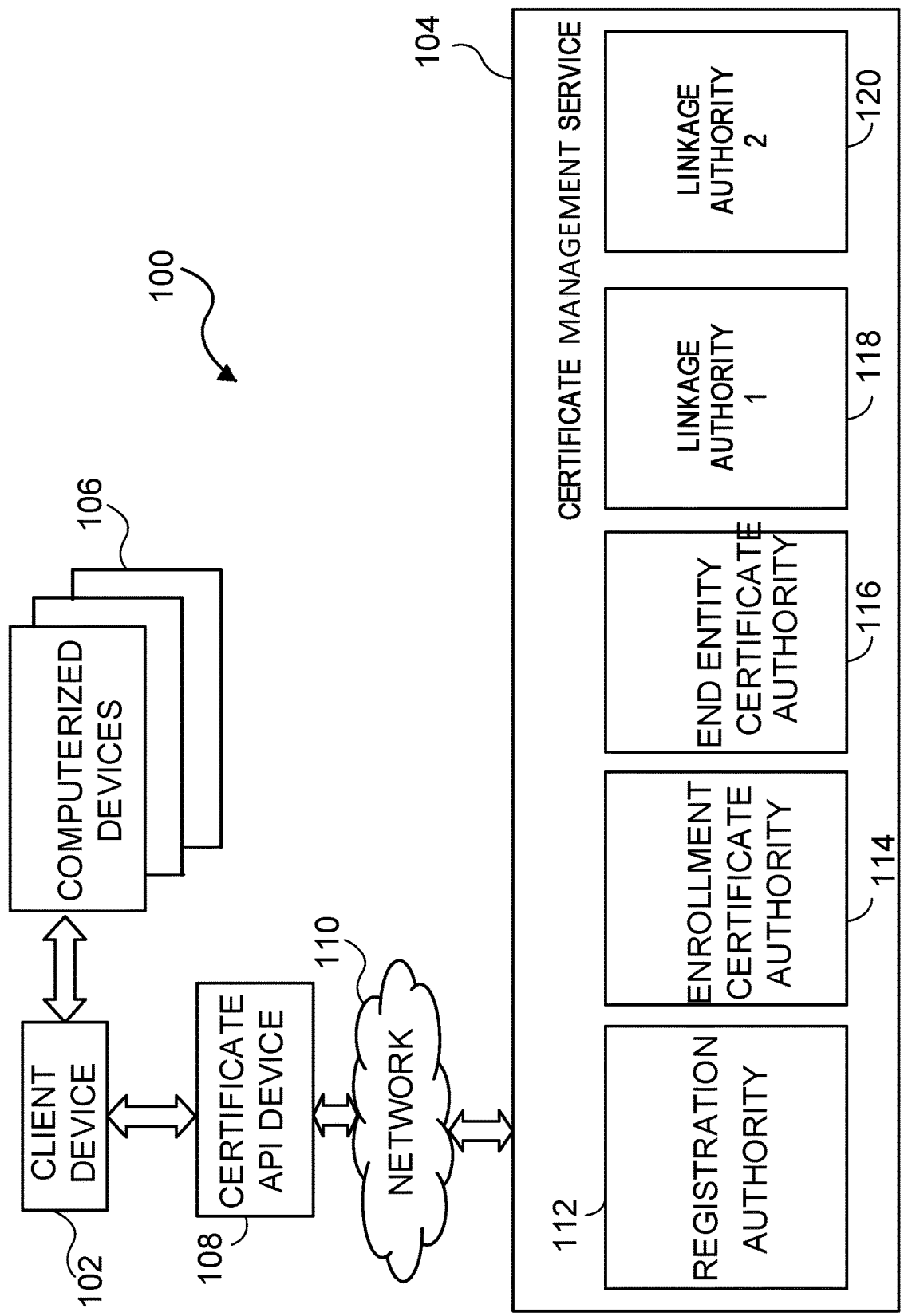
FIG. 1 is a block diagram of an example operating environment for a certificate management service, a certificate API device, and a client device, consistent with example embodiments described herein.

Reference will now be made in detail to various implementations of the techniques described herein, examples of which are illustrated in the accompanying drawings. Wherever convenient, the same reference numbers will be used throughout the drawings to refer to the same or like parts.

Introduction

In order to ensure safe and proper operation in the field, embedded devices, for instance, the Electronic Control Units (ECUs) used in vehicles, are initialized during manufacturing by provisioning digital assets, such as security assets. Digital assets can include various digital certificates, cryptographic keys, a unique identifier, and software. In some examples, a CMS or a certificate management service that generates these digital assets and the manufacturing factories where these digital assets are programmed into ECUs are located in different geographical locations, which are conventionally interconnected via insecure Internet communications. A secure channel, in the context of the present teachings, is an encrypted communications channel in which one or more of the communicating entities is authenticated to the other(s). It is therefore desirable to create an end-to-end secure channel from the origin of these digital assets to the device, such that the digital assets cannot be accessed or modified by malicious parties or by accident. Typically, different manufacturing factories and tenants (e.g., customers and clients) require different numbers of digital assets (e.g., different-sized bundles of digital certificates). Therefore, in order to minimize manufacturing time, it is also desirable to minimize delays in providing these digital assets due to computing capacity bottlenecks or communications bandwidth limitations associated with large requests.

One of the drawbacks to traditional or conventional certificate management systems (CMSs) and certificate management services is that they issue certificates on a first-come, first-served basis. This creates a technical problem in that when a large request is made by a customer and received, subsequent requests coming to the certificate management system or service after the large request must wait for that large request to be completed before they are serviced. Traditional techniques for minimizing delays or bottlenecks associated with waiting for large certificate requests to be fulfilled include having independent certificate management services with dedicated equipment for each customer. Issues with this traditional approach are that allocating dedicated equipment is expensive, inefficient, and underutilizes computing resources and bandwidth because equipment dedicated to a given customer may be idle while other equipment dedicated to another customer is at maximum capacity. Systems, methods and devices consistent with the present disclosure address these and other problems of conventional certificate management systems and services, and may provide an efficient multi-customer solution.

Provisioning generally refers to the set of actions taken to prepare a computerized device with appropriate data and software. It may also include the set of actions taken to properly install the device in its operational environment, making it ready for operation. The actions include loading the appropriate digital assets (e.g., operating system, device drivers, middleware, applications, digital certificates, and the like) into a digital storage (e.g., memory) of the device, and appropriately customizing and configuring certain digital assets on the device (if needed), which digital assets may be unique to each particular device. The actions may also include verifying that the computerized device is a legitimate device created by a legitimate device manufacturer, and not a copy or a counterfeit device.

The actions may also include correctly installing the device into its operational environment and testing it to verify that it is operating properly. The ability to securely provision only known-to-be-good devices is complicated by the fact that the devices may be built by one manufacturer and later installed by another into a larger system or device. For example, an On Board Unit (OBU) built by a component manufacturer may be installed into a car built by the car manufacturer. An improperly installed device may function incorrectly.

Techniques Described Herein

Techniques and implementations described herein provide an application programming interface (API) that can enable asynchronously retrieving computerized device-specific data from a client device and providing software packages from an external server or certification management system and providing the software packages to computerized devices via a client device. The API described herein can provide an improved service to selected users, customers, and client devices. The API described herein can reduce latency for retrieving software packages and improve the efficiency of a client device that is to install software packages on any number of computerized devices. In some examples, the API can enable a client device to retrieve software packages and install the software packages despite limited network connectivity, bandwidth issues, low upload data transfer rates, low download data transfer rates, and per-session upload/download limits (i.e., total amount of megabytes or gigabytes that can be uploaded and/or downloaded during a network session). Device specific information can be acquired at an early manufacturing stage and then, while the device is being manufactured, the required certificates can be computed so that when the device reaches the end of the manufacturing line, the computed certificate bundles are made available to the device without delay. Thus pauses and delays in manufacturing due to certificate preparation can be eliminated.

Disclosed herein are systems, methods, and devices for providing an application programming interface that can fulfill requests from client devices to generate certain types of digital assets such as security credentials and digital certificates. In various implementations, the systems, methods, and devices use a certificate management device, also referred to herein as a certificate API device, to provide an API to clients requesting certificates from a certificate management system (CMS) also referred to herein as a security certificate management system (SCMS). In some implementations, the CMS hosts a certificate management service that accepts requests from the certificate management device to create and provide certain types of digital assets such as security credentials and public key certificates. In some embodiments, the certificate management device uses the API to request and manage the retrieval of digital assets from the CMS. In various implementations, the certificate management service is able to create certificates for Vehicle-to-Vehicle and Vehicle-to-Infrastructure (V2X) devices, as well as Car-to-Car and Car-to-Infrastructure (C2X) devices. In various implementations, a system includes a certificate management device that enables the asynchronous retrieval of digital assets requested by client devices. In some embodiments, the certificate management device is communicatively connected to a client device and connected to the CMS via any suitable network connection. The certificate management device can transmit requests to the certificate management service that generates certificates, such as enrollment certificates and end entity certificates, in response to receiving requests for such certificates from a client device.

In various implementations, a system provides an application programming interface that enables requesting certificates from a certificate management service. The application programming interface (API) can be operable to receive certificate requests from a plurality of clients, where each certificate request indicates a number of computerized devices needing certificates along with their public keys to be used to create the certificates, a timestamp indicating when the certificate request was transmitted, and a particular client requesting the certificates. The API can transmit the requests for certificates from one or more client devices to a certificate management system. The API can then bundle digital assets received from the certificate management system. For example, the API can bundle any number of digital assets received for each computerized device and transmit the bundle of digital assets to the client device for provisioning of the computerized devices. In some implementations, the group size corresponding to a subset of the number of computerized devices needing certificates is a tunable, numeric value that has a default value of 1, or any other suitable numeric value.

In certain implementations, the computerized devices correspond to one or more of an On Board Unit (OBU), an Electronic Control Unit (ECU), and a Road-Side Unit (RSU), where an OBU is configured to be installed in one or more of a vehicle, a watercraft (e.g., a boat), an aircraft, a spacecraft, a medical device, a robot, a drone, a wireless or wired communication module, and an IoT device, an ECU is configured to be installed in one or more of a vehicle, a watercraft, an aircraft, a spacecraft, a medical device, a robot, a drone, a wireless communication module, a wired communication module, and an IoT device, and an RSU is configured to be installed in one or more of a traffic control device, a pedestrian warning system, a wireless communication system or module, a digital billboard, and an electronic sign.

In certain implementations, at least one client device also referred to as a tester device acts as a proxy between the certificate management service and at least one computerized device needing certificates. The tester device can be located at a manufacturer's site, such as, for example, a factory. According to such implementations, the at least one computerized device can retrieve certificates from the tester device after the tester device receives the certificates from the certificate management service. In additional implementations, a plurality of clients can include at least one server acting as a proxy between the certificate management service and at least one computerized device needing certificates. In accordance with such implementations, the at least one computerized device can retrieve certificates from the server after the server receives the certificates from the certificate management service.

In additional implementations, the API is a Representational State Transfer (REST) API or Simple Object Access Protocol (SOAP), among others, that is operable to receive, via a communications network, certificate requests from a plurality of clients, the certificate requests including requests for enrollment certificates; and transmit, on behalf of the certificate management service, via the communications network, to the plurality of clients, enrollment certificates generated by an enrollment certificate authority of the certificate management service. According to some implementations, the API requests further include requests for end-entity certificates, and the API is further operable to transmit, on behalf of the certificate management service, via the communications network, to the plurality of clients, end entity certificates generated by a end entity certificate authority of the certificate management service. In accordance with some implementations, an enrollment certificate is a public key certificate identifying a holder of the public key certificate as an authorized participant in an ecosystem including a plurality of computerized devices, and wherein each authorized participant in the ecosystem is able to receive one or more end entity certificates that enable communications with the plurality of computerized devices. In some examples, the end entity certificates enable applications to execute runtime operations such as safety related instructions, location related instructions, speed related instructions, and directional or heading related instructions, among others.

The services and API described herein are intended to provide manufacturers of computerized devices, such as chip and ECU manufacturers, flexibility and reduced latency when initially provisioning digital assets, such as V2X certificates within an End Entity (EE), which is some type of computerized device. In some examples, each call to the services or API can be a synchronous HTTPS REST call that can return some immediate status or artifact in Javascript Object Notation (JSON), or any other suitable programming language. The provisioning process of the techniques herein can be launched with an enrollment request route that has a variety of options, depending on the needs and constraints of the manufacturing process. In some implementations, in order to save time on the manufacturing line, this request can be made prior to initiating the manufacturing of the end entity. Requests can still be made in real-time, but this provisioning process has the benefit of reducing latency on the line and ensuring that all needed enrollment packages are ready to be downloaded locally. At any time, the status of specific computerized devices, e.g., groups of chips or individual chips, may be requested in order to determine readiness.

The initial enrollment request can be made for individual chips or for a batch of chips. Either option allows for tracking a status via a group or batch identifier. The process of provisioning a computerized device, such as an OBU, often takes on the order of several minutes to complete, depending on the current load of the certificate management service, which is related to the number of assets (e.g., certificates) initially provisioned. In various implementations, the entire enrollment and provisioning process is a two-stage asynchronous process, in which, for example, an enrollment certificate is retrieved at one stage, and end entity certificate bundles received at another. In another aspect, the basic EE assets needed to create the enrollment certificates as well as end entity certificates are acquired at one time and then at a later time, the enrollment and end entity certificates are provided by the API to the tester device for programming. This flexibility takes into consideration the time to generate and download the end entity certificate bundles but also allows for separate download locations for each stage. In some examples, batches can be enrolled prior to manufacturing, if possible, so that the status of the provisioning can be guaranteed to be "READY" in order to reduce manufacturing line delays. Numerous options are available for downloading of the final bundle, as enrollment certificate injection and end entity certificate provisioning may occur at different locations. For example, the end entity certificates may be downloaded at an OEM facility rather than a Tier 1 site.

In such implementations, OBU pseudonym certificate provisioning from the certificate management service API can include gathering an enrollment certificate and bootstrapping information, as well as the provisioning of many weeks of anonymous pseudonym certificates. In various implementations, the API described herein abstracts the process from the device and makes the individual requests on behalf of the device. The caller of the API, such as a client device, can monitor or poll the status of the chip request, and once complete, can download the final bundle of information all at once, rather than directly interact with the CMS for all of the various downloads. The API conveniently bundles the bootstrapping and provisioning info into two files that may be processed or unzipped and installed on computerized devices by a client device.

FIG. 1 depicts an example operating environment 100 where a client device 102 (also referred to herein as a "tester device") interacts with a certificate management service 104, which is an example of one type of service for providing digital assets. In some implementations, the certificate management service 104 may be a V2X certificate management service. In additional or alternative implementations, the certificate management service 104 may be a C2X certificate management service and may be implemented as a server(s), one or more virtual machines (VMs) on one more computing devices, or the like. As shown, the client device 102 can submit a request for certificates for one or more computerized devices 106 to the certificate management service 104 via a certificate API device 108 and a network 110, such as the internet. In certain implementations, the computerized devices 106 correspond to one or more of a vehicle, a watercraft (e.g., a boat), an aircraft, a spacecraft, a medical device, a robot, a drone, a wireless or wired communication module, and an IoT device. For example, the computerized devices 106 can correspond to an OBU or an ECU of a vehicle, a watercraft, an aircraft, a spacecraft, a robot, a drone, a medical device, or an IoT device. Also, for example, the computerized devices 106 can correspond to an RSU of a traffic control device (e.g., a traffic signal, a traffic light, or electronic traffic signage), a digital billboard, a pedestrian warning system, a motorcycle sensor, a bicycle sensor, an electronic sign, a street light sensor, or a construction warning sensor, among others. In some embodiments, the client device 102 can be connected to the certificate API device 108 via any suitable secure communication channel or secure transmission link. In some examples, the certificate API device 108 can be connected to the CMS 104 via any suitable secure communication channel or secure transmission link.

In the operating environment 100, the request for certificates is received by the certificate API device 108 from the client device 102 via any suitable interface. For example, the certificate API device 108 can implement an API based on a client representational state transfer (REST) protocol, or a simple object access protocol (SOAP), among others. As shown in FIG. 1, the certificate API device 108 can implement a public or private API, and the certificate management service 104 can be a V2X or C2X certificate management service. The certificate management service 104 accepts the request for certificates, completes the task within a timeframe, and then returns the results (e.g., the generated certificates) to the client device 102 via the certificate API device 108 and the network 110. In some implementations, the timeframe can be a number of minutes, hours, or days, depending on the processing capacity of the certificate management service 104, among other things.

In some embodiments, the certificate management service 104 can return the results or generated certificates to the computerized devices 106 via the certificate API device 108. For example, the computerized devices 106 can receive code that enables the computerized devices 106 to communicate directly with the certificate API device 108 while bypassing the client device 102. In some examples, the computerized devices 106 can be pre-programmed with software to communicate directly with the certificate API device 108. In some embodiments, the computerized devices 106 can communicate in a mesh configuration in which the computerized devices 106 serve as a client device 102 for additional downstream computerized devices 106.

The certificate management service 104 includes components for generating the requested certificates. In the example of FIG. 1, these components include a registration authority 112, an enrollment certificate authority 114, an end entity certificate authority 116, a linkage authority 1 118, and a linkage authority 2 120.

In additional or alternative implementations, the components of the certificate management service 104 may vary depending on whether the certificate management service 104 is configured as a V2X or C2X certificate management service. For example, in cases where the certificate management service 104 functions as a C2X certificate management service, the certificate management service 104 can include an Enrollment Authority (EA) configured to fulfill a role similar to that of the enrollment certificate authority 114. Similarly, when the certificate management service 104 is embodied as a C2X certificate management service, the certificate management service 104 can include an Authorization Authority (AA) that fulfills a role similar to that of the end entity certificate authority 116. The components of the certificate management service 104 are described in the following paragraphs.

In an example, the certificate management service 104 can be embodied as a CMS. Various implementations of the certificate management service 104 may be used for extremely high volume device transaction and certificate generation processing. In various implementations, the certificate management service 104 may be implemented using multiple servers, multiple hardware security modules (HSMs), multiple compute or computing engines, and multiple application platforms. In an example implementation, the application platforms may each include one or more VMs for hosting the registration authority 112, the enrollment certificate authority 114, the end entity certificate authority 116, and the linkage authorities 118 and 120. In additional or alternative implementations, the application platforms may each include one or more hardware platforms, such as, for example, application servers, computers, or other computer hardware capable of hosting and executing a software application. In the example of FIG. 1, the application platform for the enrollment certificate authority 114 may be one or more VMs that run an application for the enrollment certificate authority 114, the application platform for an end entity certificate authority 116 may be one or more VMs operable to host and run an application for the end entity certificate authority 116. Similarly, the application platform for a linkage authority 1 118 may be one or more VMs configured to host and run a linkage authority 1 application, and the application platform for a linkage authority 2 120 may be one or more VMs operable to host and run a linkage authority 2 application. Non-limiting examples of the certificate management service 104 may be implemented in a private data center, a cloud data center such as, for instance, Amazon web services (AWS) from Amazon, or in a hybrid of private and cloud data centers.

In some implementations, the certificate management service 104 may provide security certificates such as, for example, enrollment certificates and end entity certificates, to be used by a tester device or distributor appliance of a manufacturer. In certain implementations, the certificate management service 104 may interact with a digital asset management system (DAMS, not shown) in order to provide certificates to a distributor appliance (not shown) or client device 102.

As illustrated in FIG. 1, the architecture of the certificate management service 104 includes a registration authority 112, the enrollment certificate authority 114, the end entity certificate authority 116, the linkage authority 1 118, and the linkage authority 2 120. Each of these components may utilize respective, dedicated compute engines (not shown) to perform tasks. For example, the registration authority 112 can utilize a registration authority compute engine, the enrollment certificate authority 114 can utilize an enrollment certificate authority compute engine, the end entity certificate authority 116 can utilize an end entity certificate authority compute engine, the linkage authority 1 118 can utilize a linkage authority 1 compute engine, and the linkage authority 2 120 can utilize linkage authority 2 compute engine. The functionalities of each of these components are described in the following paragraphs.

In some embodiments, the architecture of the certificate management service 104 advantageously separates the non-security-related applications from the security functions. As shown in the example of FIG. 1, the registration authority 112, the enrollment certificate authority 114, the end entity certificate authority 116, and the linkage authorities 118, 120 are implemented as applications on their own VMs, which execute on their own dedicated compute engines, all of which are separate from any non-security-related applications and functions. This provides both a technical and security advantage and improvement over conventional systems, in which the performance of the HSMs is slow or in which the cloud service provider cannot supply HSMs or in which their proper management of the HSMs is uncertain. In the certificate management service 104, the cryptographic operations that utilize an HSM are performed in a compute engine (e.g., one or more of compute engines).

By separating the critical security functions from each other and onto separate compute engines, as shown in FIG. 1, the computation-intensive crypto and security functions (e.g., an elliptic curve butterfly expansion computation or an elliptic curve digital signature), for instance, as performed by the registration authority 112, the enrollment certificate authority 114, the end entity certificate authority 116, and the linkage authorities 118, 120, are performed significantly faster than existing conventional similar systems. This design, in conjunction with the certificate API device 108 described below, enables significant improvements in transaction processing in a multi-client environment by preventing any issues related to the network 110 from interfering or delaying the provisioning of the computerized devices 106 with digital assets retrieved from the certificate management system 104 or the client device 102. The client device 102 can batch the raw data needed for certificate creation and send the data to the certificate API device 108 to remove latencies/interruptions as well as to allow for accumulating the raw data from multiple sites at different times. For example, the client device 102 can retrieve or pre-load enrollment packages and end entity certificate packages, and the like, from the CMS 104. Accordingly, the certificate API device 108 can provide the retrieved enrollment packages and end entity certificate packages to the computerized devices 106 during the provisioning process without network delays that may exist between the certificate API device 108 and the CMS 104. In some examples, the certificate API device 108 can avoid bandwidth issues, network connectivity issues, and the like, while provisioning computerized devices 106. Furthermore, the certificate API device 108 can, in some examples, retrieve the enrollment packages and the end entity certificate packages asynchronously from the CMS 104 and asynchronously provide the enrollment packages and the end entity certificate packages to the computerized devices 106. The asynchronous retrieval and distribution of the enrollment packages and end entity certificate packages can further reduce the time of the provisioning process for each computerized device. As such, implementations consistent with the present disclosure provide a particular, technically advantageous system architecture to asynchronously provide digital assets to and retrieve digital assets from the certificate management system and bundle the digital assets for the computerized devices 106.

In some embodiments, if the scale of the registration authority application executed by the registration authority 112 is to be modified, additional VMs can be added while no change may be required in the secure compute capability of the registration authority compute engine(s). Alternatively, if the security computations are limiting performance, additional secure registration authority compute engines can be added. This same multi-dimensional scaling is true for the other components of the certificate management service 104. These capabilities provides significant performance improvements and scalability over existing conventional Certificate management services (CMS). In some implementations, the respective application platforms for the registration authority 112, the enrollment certificate authority 114, the end entity certificate authority 116, and the linkage authorities 118, 120 are communicatively connected to compute engines via respective sets of input message queues so that these components of the certificate management service 104 can all scale independently from each other.

As noted above and shown in the non-limiting example of FIG. 1, each of the registration authority 112, the certificate authorities 114, 116, and the linkage authorities 118, 120 may be implemented as applications on their own VMs. In additional or alternative implementations, one or more of the registration authority 112, the certificate authorities 114, 116, and the linkage authorities 118, 120 can execute on hardware platforms (e.g., servers or compute engines). The roles and functionalities of each of these applications executing on application platforms (e.g., VMs or hardware platforms) are described in the following paragraphs.

In various implementations, the registration authority 112 can be the authority in a provisioning network that verifies user requests for a digital certificate, or other type of digital security asset, and enable a certificate authority, (e.g., the enrollment certificate authority 114 and the end entity certificate authority 116) to issue the digital certificate. In various implementations, the registration authority 112 can implement any suitable public key infrastructure (PKI) techniques. In various implementations, the certificate API device 108 can pass certificate requests to the registration authority 112, which can be implemented as a representational state transfer (REST) web service, or a SOAP based service, among others. In various implementations, there may be multiple instances of the registration authority 112 executing at the same time. This is similarly represented for the other components of the certificate management service 104 shown in FIG. 1. The registration authority functionality of the certificate management service 104 is non-centralized in that its functionality can be carried out by multiple instances of the registration authority 112 implemented as a REST web service. One role for the registration authority 112 is to grant and fulfill certificate provisioning requests while preventing the signing end entity certificate authority 116 from determining which certificates are to be stored in a particular computerized device. The registration authority 112 can interact directly with the end entity certificate authority 116, and the linkage authorities 118, 120 via any secure communications channel, including, for example, but not limited to, message queues in order to fulfill their roles within the certificate management service 104.

In certain implementations, the registration authority 112 (and the other components of FIG. 1) may be connected to a database (not shown). The certificate management service 104 may utilize a collection of data stores or databases for data storage and retrieval. For example, the database used may consist of one or more database logical or physical units, each with one or more tables enabling data separation where required. As used herein, the term "database" refers to one or more databases or data stores. In certain implementations, the use of multiple databases can allow for data separation between the registration authority 112 other components of FIG. 1. For example, such use of multiple databases allows for data separation between the registration authority 112, the certificate authorities 114, 116, and the linkage authorities 118, 120.

In some embodiments, the database(s) used by the certificate management service 104 is a collection of one or more fast access, low-latency databases. In some implementations, the database(s) may be a NoSQL database or database service, such as, for example, the DynamoDB data service offered by Amazon web services. In various implementations, the data stored in the database is application dependent, but may include customer-specific PSID/SSP lists, customer-specific policy data, manufacturer information, chip serial numbers, device serial numbers, past issued certificates, various linkage authority values, data on devices to whom certificates have been issued, operator actions, etc. In some examples, the data can be stored either unencrypted, encrypted, or some combination thereof.

In various implementations, the certificate management service 104 includes an enrollment certificate authority 114 and an end entity certificate authority 116, as the digital certificates produced by the registration authority 112 are split into different segments—e.g., an enrollment digital certificate and end entity digital certificates. The enrollment certificate authority 114 is a non-central component of the certificate management service 104 as there may be multiple instances of the enrollment certificate authority 114 executing at the same time. For instance, in some implementations, there may be multiple instances of the enrollment certificate authority 114 executing simultaneously. The enrollment certificate authority 114 can receive requests for enrollment certificates from the registration authority 112. One role of the enrollment certificate authority 114 is to fulfill requests from the registration authority 112 to issue enrollment certificates to end-user devices, such as, for example, a client device 102. In some embodiments, the enrollment certificate authority 114 interacts directly with the registration authority 112 in order to fulfill its role within the CMS 104.

The end entity certificate authority 116 is a non-central component of the CMS in that there may be multiple instances of the end entity certificate authority 116 executing simultaneously. For the end entity certificate authority 116, in various implementations, there may be multiple instances of the end entity certificate authority 116 executing in parallel at the same time. The end entity certificate authority 116 may receive requests for end entity certificates from the registration authority 112. A role of the end entity certificate authority 116 is to fulfill requests from the registration authority 112 to issue end entity certificates to end-user devices, such as, for example, a computerized device 106. In certain implementations, the end entity certificate authority 116 fulfills requests for short-term end entity certificates for V2V functionality. In some embodiments, the end entity certificate authority 116 interacts directly with the registration authority 112 in order to fulfill its functions within the CMS 104.

In various implementations, the linkage authorities 118, 120 shown in FIG. 1 link the identity of the certificate requestor (i.e., a unique identifier of the certificate requestor's device), to an issued end entity certificate for revocation purposes. That is, the linkage authority 1 118 and linkage authority 2 120 provide respective linkage values as unique identifiers of the certificate requestor's device to the issued end entity certificate. The linkage authority 1 118 and linkage authority 2 120 can receive requests for linkage values from the registration authority 112, and then provide the requested linkage values to the registration authority 112. The linkage authorities 118, 120 interact directly with the registration authority 112 in order to fulfill requests for linkage values.

In various implementations, the compute engines of the CMS 104 can include HSMs, which allow these components to perform secure computations without being unduly threatened from hackers. In some implementations, the compute engines may be designed to perform secure computations themselves without requiring an embedded HSM—in such implementations, they embody the HSM.

In various implementations, different HSM versions may be used in the CMS 104. For example, the HSMs may include embedded HSMs installed as plug-in cards within one or more of the compute engines. In such example implementations, the embedded HSMs may be installed in one or more of the compute engines as Peripheral Component Interconnect (PCI) HSMs or PCI Express (PCIe) HSMs. Also, for instance, the HSMs in the certificate management service 104 may include external, network-attached or network-connected HSMs that are separate from compute engines in their own enclosures.

One of ordinary skill will recognize that the components and implementation details shown in FIG. 1 are examples presented for conciseness and clarity of explanation. Other components, processes, implementation details, and variations may be used without departing from the principles of the techniques described herein, as this example is not intended to be limiting and many variations are possible.

Figure 2:
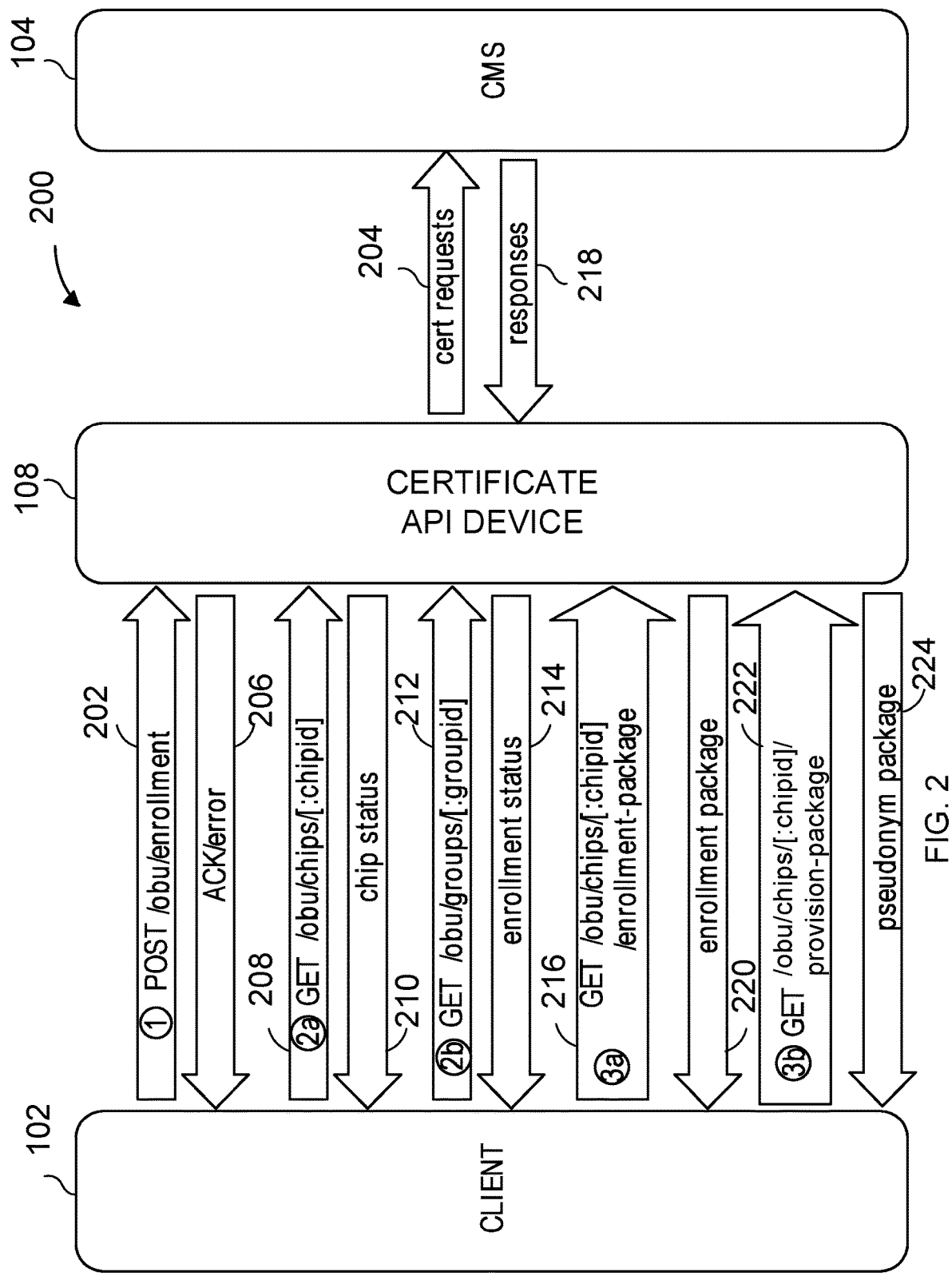
FIG. 2 is a data flow diagram illustrating example data flows between a client device, a certificate API device, and a CMS, consistent with example embodiments described herein.

FIG. 2 is a block diagram of an example system for using an application programming interface to provide provisioning information to and retrieve digital assets from a certificate management system. In some embodiments, the system 200 can be implemented with any suitable computing devices such as the client device 102, certificate API device 108, and various computing devices of the certificate management system 104 described above in relation to FIG. 1.

In some embodiments, the client device 102 can transmit an enrollment request 202 to a certificate API device 108. The enrollment request can be transmitted using any suitable protocol such as a POST protocol, among others. The request can be used to enroll a batch of computerized devices 106 such as on board units, roadside units, and the like. In some examples, the request to enroll a batch of computerized devices 106 can include various parameters. For example, the request can include the public keys associated with each chip and a group identifier corresponding to a batch of chips to be provisioned with digital assets. A chip, as referred to herein, can include any suitable hardware component within a computerized device to be provisioned such as an on-board unit, a road side unit, and the like. The digital assets can include an enrollment package and an end entity certificate package, among others. For computerized devices that cannot store/archive their own keys for future use, the digital assets may include the wrapped keys for each chip. In some embodiments, the enrollment package can include any number of enrollment certificates, bootstrapping information, applications, firmware, and the like. In some examples, the end entity certificate package can include any number of end entity certificate certificates that enable a computerized device to securely communicate with additional computerized devices. The enrollment package and end entity certificate package are described in greater detail below in relation to FIGS. 3 and 4. The request can also include a name of a chip manufacturer, a model number for a chip, and a name of an electronic control unit owner used to determine which local policy file to include in final provisioning. The request can also include an array of roadside unit request information including public keys, and an optional wrapped key. A wrapped key can include any suitable encryption key that is stored within an encrypted data packet. In some embodiments, the client device 102 or the computerized devices 106 can decrypt the encrypted data packet and store the private encryption key from the encrypted data packet. In some embodiments, the request can include a slot number for an enrollment private key, a public enrollment seed key, a provider service identifier (PSID) and optional service specific permission (SSP) parameters such as, for example, but not limited to, geographic region that the certificates are created for and a customer profile identifier that are included in enrollment and end entity certificate certificates. The geographic region can include a specific rectangular region, a circular region, or a named region, for example, a country code, The customer profile number can be used to manage configurable parameters for an entire customer group. The slot number corresponds to the location of the private key residing in the computerized device.

In various implementations, the PSID and the SSP parameters can indicate the messages which can be signed by an application. In some embodiments, the PSID is associated with an application specification that indicates how to generate interoperable instances of that application. For example, the SSP parameters can indicate state dependent permissions for an application, wherein the state dependent permissions enable particular subsets of activities. In one example, an SSP parameter can give extra permissions for a fire truck enrollment certificate or a pseudonym certificate, wherein the SSP parameter allows for "signal pre-emption," which can include sending a message to a traffic light to change the displayed light color. A non-emergency vehicle would not have that SSP parameter in its certificates and would not be granted that permission. If an unauthorized user accessed a non-emergency vehicle and attempted to send a message to change the traffic light color, the traffic light RSU can verify that the non-emergency vehicle does not have the correct SSP parameter and reject the request.

The certificate API device 108 processes the enrollment request 202, and in the event of an error, the certificate API device 108 can return 206 any suitable error code, such as internal server error or bad request, to the client device 102. In the event of a successful request operation, the certificate API device 108 can transmit 206 an acknowledgment of a successful request operation to the client device 102. As shown in this embodiment, the certificate API device 108 can then transmit the enrollment request(s) 204, e.g., for batches of computerized devices, to the certificate management service 104. And also as shown in this example, in response, the CMS 104 creates the requested enrollment certificates (and possibly other digital assets) and sends them in response(s) 218 to the certificate API device 108, which may store them, at least temporarily. The certificates returned by CMS 104 may contain other centrally-managed data such as PSID/SSPs required by, for example, the EE manufacturer.

In some embodiments, the certificate API device 108 can store any number of enrollment packages and end entity certificate packages for the client device 102. Accordingly, the certificate API device 108 can bundle the digital assets or packages to be transmitted to the client device 102. As the certificate API device 108 receives a portion of each batch of requested packages, the certificate API device 108 can be queried by the client device 102 to determine the status of the certificate creation by the certificate management system 104. For example, the client device 102 can transmit a status request 208 for information related to a single chip. The status request 208 can be processed by the certificate API device 108 to determine the programming readiness of the enrollment certificate package to be retrieved for a client device 102. In some examples, the status request 208 can include a unique chip identifier (e.g., chipid as shown in FIG. 2). The status request returns, for example, a name of a chip manufacturer, a model number of a chip, a group identifier for a batch of chips, a serial number for the electronic control unit, and a name of an electronic control unit manufacturer. In response, the certificate API device 108 can return a chip status 210 to the client device 102 indicating whether an enrollment certificate has been received from the CMS 104 for the computerized device or chip that was specified in the status request 208, which is to be provisioned by the client device 102. The response 210 to the status request 208 can also include a public enrollment seed key, a slot number for an enrollment seed private key, a wrapped key, an enrollment request or enrollment received indicator, and a timestamp corresponding to when an enrollment certificate is received.

In some embodiments, the client device 102 can also transmit a group enrollment status request 212. The group enrollment status request can query the names of the group (s) of computerized devices or chips that have been enrolled with the certificate API device 108. With each enrollment request 202, there is a corresponding group name (e.g., groupid as shown in FIG. 2) that can be requested at 212. The group name can be, for example, a tape reel identifier corresponding to a group of chips delivered to an ECU manufacturer. In some examples, the group name can be an identifier for a group of chips to determine provisioning status and readiness at a larger scale. For example, the certificate API device 108 may process the group enrollment status request 212 to determine whether the provisioning data, such as enrollment packages and end entity certificate packages, for a reel of chips (e.g. an onboard unit group or a roadside unit group) are ready for download from the certificate API device 108. In some examples, the group enrollment status request 212 can be paginated and ordered by the upload time in descending order (e.g. newest first, oldest first, etc.). In some embodiments, the group enrollment status request 212 can also indicate a descending or ascending order, an enrollment status indicator, and a request date. The enrollment status response 214 can indicate an array of names of the groups that have certificates that have been retrieved by the certificate API device 108, a current page of the list of group names, and the total number of pages available.

In some embodiments, the client device 102 can transmit a request 216 to retrieve an enrollment package for a chip (e.g., specified by chipid) or computerized device. In some examples, the request can be for any chip with an enrollment package received status, e.g. which status may have been communicated to the client 102 in a chip status message or response 210 or an enrollment status response 214. For example, the client device 102 can request enrollment packages 216 if the certificate API device 108 has retrieved or otherwise obtained 218 the enrollment packages for a group of chips or computerized devices from the CMS 104. If wrapped key indicators, such as a wrapped signing caterpillar key (SCK) indicator or a wrapped encryption caterpillar key (ECK) indicator, were provided in the initial request, then the binary of these wrapped encryption keys can be provided rather than a slot number. A caterpillar key, as referred to herein, is the seed key that is used in Butterfly expansion, in order to derive many signing and/or encryption keys on a device with limited memory based on one seed signing/encryption key and a butterfly expansion value. In some examples, the butterfly expansion algorithm can use the seed key and a butterfly expansion value along with an index representing the week and index within that week of overlapping credentials. The computerized device 106 can then derive the private signing and/or encryption keys from the caterpillar keys and match these keys with the corresponding certificates that were generated by the CMS 104. The public keys created by the CMS 104 and the private keys derived on the computerized device 106 correspond to each other since the CMS 104 uses the same derivation algorithm and inputs to get the correct public key. In some embodiments, the keys derived from the ECK are used for encryption on the device. The keys derived from the SCK are conversely used for signing data and messages.

In some examples, detecting a wrapped encryption key indicates that there is a master key that encrypted the private ECK and SCK components of the key pair so that the private ECK and SCK components are not accessible by unauthorized users and/or unauthorized devices. In various implementations chipsets that are on some OBUs and RSUs can include one or more master key(s) in secure on-chip storage, such as flash memory, while storing other encryption keys on a separate unsecured storage chip. In some embodiments, the private ECK and SCK components are stored in a "wrapped" format or encrypted by the master key. When firmware running on the chip attempts to access the private ECK or SCK keys, the firmware can retrieve or obtain the "wrapped" private key, unwrap (decrypt) the wrapped key into secure RAM memory of a chip, and then instructions executed by the chip can access the decrypted private SCK and/or ECK keys. If the chip is powered down, the decrypted private SCK and/or ECK keys can be lost or deleted due to their storage in volatile memory. In some examples, the master key persists in the secure storage as well as the wrapped private SCK and ECK keys in off-chip storage.

In some embodiments, when binaries are provided, the caller of the API can determine that the device did not have on-board memory attached when the keys were created, and therefore, the caller of the API (e.g., the client 102) can inject the wrapped keys into appropriate "slots" or storage at load time.

In processing the application package request 224, the certificate API device 108 can retrieve the stored application certificate and one or more corresponding private reconstruction values, as well as any initial CMS bootstrapping information required, and send these digital assets to the client 102 in an application package response 224. The private reconstruction values can be generated with an elliptic curve QuVanstone (ECQV) algorithm, among others, that creates certificates for the CMS 104. In some embodiments, the computerized device 106 provides a seed key pair, and a certificate authority certifies the seed key pair based on the generation of an implicit certificate that includes the public reconstruction value and a private reconstruction value. In some examples, the computerized device 106 can obtain the public and private reconstruction values, and using elliptic curve math, can apply the values to the seed key pair values to derive the true, certified public and private keys. In various implementations, this is a process for generating implicit certificates, which do not have a full public key or signature. That can be a separate process from butterfly expansion. If the enrollment certificate has not yet been received by the certificate API device 108 from the CMS 104, the certificate API device 108 can return an error code (not shown). In some examples, the response 220 is or includes a zip file, named with the chip identifier string, and containing various elements. For example, the response 220 can include a hashed identifier of an enrollment certificate, an enrollment certificate, an enrollment reconstruction value, and private seed key meta data indicating an algorithm type, a length of an HSM slot number, and an HSM specific slot number in binary. The response 220 can also include a local policy, and a local certificate chain, among other things.

In some embodiments, the client device 102 can also request 222 the retrieval of an end entity certificate package for a computerized device, such as a chip. In some examples, the request 222 can be for any chip with an end entity certificate package received status, e.g. which status may have been communicated to the client 102 in a chip status message or response 210. For example, the client device 102 can request end entity certificate packages if the certificate API device 108 has retrieved 218 the end entity certificate package(s), e.g., for a group of chips or computerized devices, from the CMS 104. If wrappedSck and wrappedEck were provided in the initial request, then the binary of these wrapped keys can be provided rather than the private seed key meta data, which may include the HSM slot number. When wrapped keys are provided, it is assumed that the computerized device did not have on-board memory attached when the keys were created, and therefore, the client device 102 can inject the wrapped keys into adequate "slots" at load time. In response to the request 222, the certificate API device 108 can retrieve the Local Certificate Chain file, Local Policy file, and initial set of end entity certificates from the CMS 104, e.g., via a certificate request 204 and response 218. If the end entity certificate package has not yet been downloaded or otherwise obtained from the CMS 104, the certificate API device 108 can return an error code. In some embodiments, the end entity certificate package response 224 is a zip file, named with the chip identifier string, containing elements such as a hashed identifier of an end entity certificate, a hashed identifier of a provisioning request, a download time, a download uniform resource locator (URL) and port number, a sign expansion key, a response decryption expansion key in binary, and response decryption private seed key meta data, which includes an algorithm type, a length of the HSM slot number, an HSM specific slot number in binary, or any combination thereof. The end entity certificate package response 224 can also include signing private key meta data with an algorithm type, a length of the HSM slot number, and an HSM specific slot number in binary. The response 224 can also include the initial provisioning of end entity certificates for a chip and a zip file including encrypted certificate responses from a registration authority device.

In some embodiments, the certificate API device 108 can support any suitable number of additional requests. For example, the certificate API device 108 can detect a request for a number of total chip (onboard unit or roadside unit) groups from the client device 102 and return a total count of unique groups that have been loaded by the certificate API device 108. In some embodiments, the certificate API device 108 can also request a number of unique of chips or computerized devices that have been loaded via the API. The request can be made using a chip identifier and, in some examples, the response can indicate a total count of unique chips or computerized devices that have been loaded with enrollment packages and/or end entity certificate packages. In some examples, the request can include a group identifier, a list of chip identifiers associated with the group, an enrollment status indicator, a percentage of the chips enrolled, a time of the request date, and a time when a last chip of the group was enrolled.

In some embodiments, if the computerized device is a road side unit, the certificate API device 108 can support the various requests described above. A road side unit can include any suitable sensor or Internet of Things device that can be installed in one or more of a traffic control device, a wireless communication module, a digital billboard, and an electronic sign, among others. However, a certificate management system may not generate an application package for the road side unit because road side units are restricted to a number of valid issued certificates at any given time. For example, the number of currently valid issued certificates to be provided to a road side unit can be limited to any suitable threshold such as one, two, three, or any other value. This differs from On Board Units (OBUs) and their pseudonym certificates, which are created for future time periods in excess, with multiple valid certificates for a given time period. In some instances, the certificate API device 108 may not support a request to receive an application package for a road side unit.

It is to be understood that FIG. 2 is an example implementation of techniques described herein and the system 200 can include fewer or additional components and devices in additional implementations. For example, the system 200 can include any number of client devices, multiple certificate API devices, and any number of certificate management systems. Furthermore, the certificate API device can support any number of requests related to retrieving digital assets, such as enrollment packages and end entity certificate packages, from the certificate management system.

Figure 3:
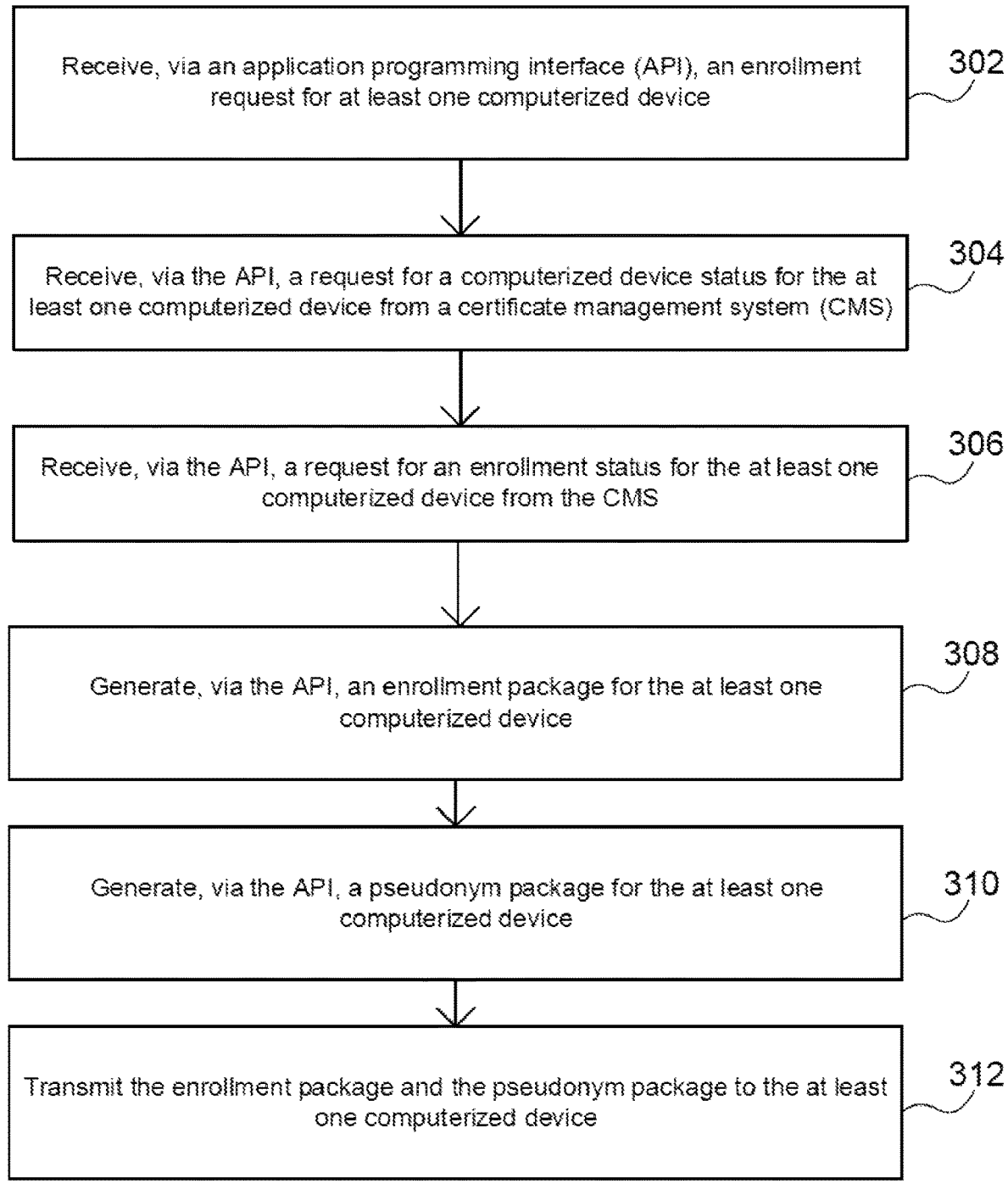
FIG. 3 is a process flow diagram of an example method for asynchronously transferring end-entity certificate packages to a number of computerized devices via a client device, consistent with example embodiments described herein.

FIG. 3 is a process flow diagram of an example method for asynchronously transferring an enrollment package and a end entity certificate package to a number of computerized devices via a client device. The method 300 can be implemented with any suitable computing device, such as the certificate API device 108 of FIGS. 1 and 2.

At block 302, a certificate API device 108 can receive, via an application programming interface (API), an enrollment request for any number of computerized devices 106. In some embodiments, the certificate API device 108 can forward the enrollment request to a certificate management service (CMS) 104. In various implementations, the certificate API device 108 can transmit, receive, and manage data using a representational state transfer (REST) protocol, or a simple object access protocol (SOAP), among others.

In some embodiments, the enrollment request can direct a certificate API device 108 to retrieve digital assets, such as digital certificates, software, and/or firmware, among others. In some examples, the digital assets enable the computerized device 106 to execute applications and real-time instructions in a secure manner.

In some implementations, the enrollment request can indicate that an enrollment package and an end entity certificate package for any number of chips or computerized devices 106 are to be retrieved from a certificate management system 104. The enrollment package, as described above, can include one or more enrollment certificates, bootstrapping data, firmware, applications to be installed, and a wrapped encryption key, among others. In some implementations, the enrollment package can be used to provision a computerized device 106. However, in some examples, the computerized device 106 may not execute real-time instructions without an end entity certificate included in the end entity certificate package. For example, the end entity certificate can enable applications installed on a computerized device to execute real-time instructions related to safety operations, speed modifying operations, location modifying operations, and the like. In some examples, the computerized device 106 can execute real-time instructions without an end entity certificate, but V2X communications with additional computerized devices may not be acknowledged or function. In some examples, the computerized device 106 can include an electronic control unit of an automobile, an on-board unit, or a road side unit, among others. In some embodiments, the enrollment request includes a computerized device identifier corresponding to an externally accessible serial number for each computerized device 106. The computerized device identifier is discussed in greater detail below in relation to block 304.

At block 304, the certificate API device 108 can receive a request, via the API, for a computerized device status for the computerized devices 106. The computerized device status, as referred to herein, can indicate a status of retrieving an enrollment package and/or an end entity certificate package for a chip or computerized device 106. In some embodiments, the certificate API device 108 can also transmit a response to the request, wherein the response includes metadata indicating whether an enrollment package and an end entity certificate package for the computerized device 106 have been retrieved from the CMS 104. The computerized device status enables a device, such as a client device 102 or certificate API device 108, to determine if enrollment packages and end entity certificate packages have been received for a particular computerized device.

In some embodiments, the API described herein can execute requests based on a valid externally identifiable serial number as the chip identifier within each request. In some examples, the serial number can be used for subsequent function calls or requests to retrieve a status for a computerized device 106 and to retrieve the enrollment and end entity certificate packages. In some embodiments, the serial number can be an identifier that can be externally retrieved from the device after manufacturing. The certificate API device 108 can store the serial numbers or identifiers, which can be used in the event that a device is compromised or stolen. In some examples, the certificate management service 104 can subsequently determine, based on the serial numbers, the enrollment certificate for a compromised computerized device and execute operations to revoke and blacklist the compromised computerized device. For example, the certificate management service 104 can ignore or otherwise prevent responding to subsequent requests from the compromised computerized device.

In some examples, since the chip identifier can be used to uniquely identify an enrollment and end entity certificate package request, multiple enrollment requests can be initiated for different applications. For cases where multiple enrollment packages are requested, the caller, such as the client device or certificate API device, can formulate the chip identifier parameter by using the external serial number followed by an underscore and postfix that indicates a separate request. For example, if the client device requests two bundles of enrollment packages or end entity certificate packages for a serial number 000-123456-EFD, then the client device can execute two requests using the following chip identifier parameters: (1) 000-123456-EFD_0 and (2) 000-123456-EFD_1.

At block 306, the certificate API device 108 can receive a request, via the API, for an enrollment status for a group of computerized devices 106. In some embodiments, the certificate API device 108 can also transmit a response to the request, wherein the response includes metadata indicating a number of end entity certificates, for example, enrollment certificates, pseudonym certificates, enrollment packages, or pseudonym packages, received for the group of computerized devices 106. In some examples, the enrollment status can indicate to a client device 102 a number or a percentage of enrollment packages and end entity certificate packages that the certificate API device 108 has received for a group of computerized devices 106. In some embodiments, the enrollment status can indicate to a client device 102 when the client device 102 can begin retrieving enrollment packages and end entity certificate packages from the certificate API device 108. For example, the certificate API device 108 can retrieve the available enrollment packages and end entity certificate packages for a group of computerized devices 106 and separately bundle the various enrollment packages and various end entity certificate packages prior to distributing the bundled enrollment packages and bundled end entity certificate packages to the client device 102.

At block 308, the certificate API device 108 can generate, via the API, an enrollment package for each computerized device 106. As discussed above in relation to block 302, the enrollment package can include bootstrapping data, and enrollment certificates, among others. The bootstrapping data, as referred to herein, can include any number of software and/or firmware updates that enable a computerized device 106 to install an application to be executed. The enrollment package can also include any number of security credentials, digital certificates, encryption keys, and the like. In some embodiments, retrieving the enrollment package in advance enables a client device 102 or certificate API device 108 to provision computerized devices 106 prior to installing end entity certificates that enable the execution of runtime operations related to V2X communications. In some examples, the enrollment package can also include a group identifier, a chip identifier, a uniform resource locator associated with the source of an enrollment certificate, and the like.

At block 310, the certificate API device 108 can generate, via the API, an end entity certificate package for each computerized device 106. In some embodiments, the end entity certificate package can include one or more bundled digital certificates or end entity certificates enabling the secure execution of runtime instructions by a computerized device 106. In some examples, the end entity certificate package can include at least one end entity certificate that enables a computerized device 106 to execute runtime instructions with an application provided in an enrollment package. For example, the end entity certificate can enable a computerized device 106 to execute an application that manages safety instructions, location instructions, speed instructions, heading instructions, and the like. In some embodiments, the end entity certificate can enable computerized devices 106 in a V2X environment to recognize and securely execute requests by additional non-compromised computerized devices 106.

At block 312, the certificate API device 108 can transmit the enrollment package and the end entity certificate package to computerized devices 106 via a client device 102. In some embodiments, the certificate API device 108 can transmit the enrollment package and the end entity certificate package to a client device 102 or computerized devices 106 using an asynchronous technique. In some implementations, the enrollment package and the end entity certificate package can modify each computerized device 106 to enable executing provisioning instructions and exchanging secure communications with additional computerized devices. The provisioning instructions, as referred to herein, can include installing applications and firmware, and storing enrollment certificates from an enrollment package, among others. In some embodiments, a computerized device 106 that has executed provisioning instructions can use end entity certificate certificates from the end entity certificate package to exchange secure communications with additional computerized devices. In various implementations, the secure communications can include requests for data related to an operating environment of a computerized device 106. For example, the secure communications can include a request for a location, a speed, or a heading, among others of a computerized device.

In some examples, the certificate API device 108 can transmit or distribute the enrollment packages to a group of computerized devices 106 via the client device 102 following the retrieval of the enrollment packages from a certificate management service 104. Similarly, the certificate API device 108 can transmit or distribute the end entity certificate packages to a group of computerized devices 106 via the client device 102 following the retrieval of the end entity certificate packages from a certificate management service 104. The asynchronous retrieval and bundling of the enrollment packages and end entity certificate packages can enable a certificate API device 108 to provision a group of computerized devices 106 using a client device 102 even with limited network connectivity to a certificate management service 104. In some examples, the certificate API device 108 can enable a client device 102 to retrieve the enrollment package and the end entity certificate package without a connection to an external network. For example, the certificate API device 108 can pre-load the enrollment packages and end entity certificate packages to be used to provision a group of computerized devices. After pre-loading the enrollment packages and end entity certificate packages into the certificate API device 108, the certificate API device 108 can respond to an enrollment request even without a connection to the CMS 104. In some examples, the computerized device 106 is a road-side unit (RSU) and the certificate API device 108 can enable a client device or computerized device 106 to retrieve the enrollment package without retrieving the pseudonym package. For example, an RSU device can use an application certificate as opposed to a pseudonym certificate to communicate with other devices. In the CMS system, pseudonym certificates can be created for OBUs with the default policy to provide any number of concurrent certificates per week, such as twenty concurrent certificates for up to 156 weeks, or any other suitable time period. In some embodiments, the default policy for application certificates is up to two application certificates at a time, or any other suitable number of application certificates at a time, wherein each application certificate is used for one week, or any other time period. In some examples, application certificates are not linked to previous application certificates, while pseudonym certificates are linked with a caterpillar key. Accordingly, for application certificates, a new key pair can be provided or obtained for every certificate. Since application certificates initially created for an RSU device may expire by the time of delivery, and the RSU device can be associated with an unknown latitude/longitude location, the RSU device can receive an enrollment certificate at the time of provisioning and receive application certificates at a later time in response to a request for application certificates for the RSU device.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 can also include retrieving a wrapped key from the CMS 104 in response to detecting the computerized device 106 comprises volatile memory. In some examples, the method 300 can include extracting a private key from the wrapped key and transmitting the private key to a computerized device 106.

Figure 4:
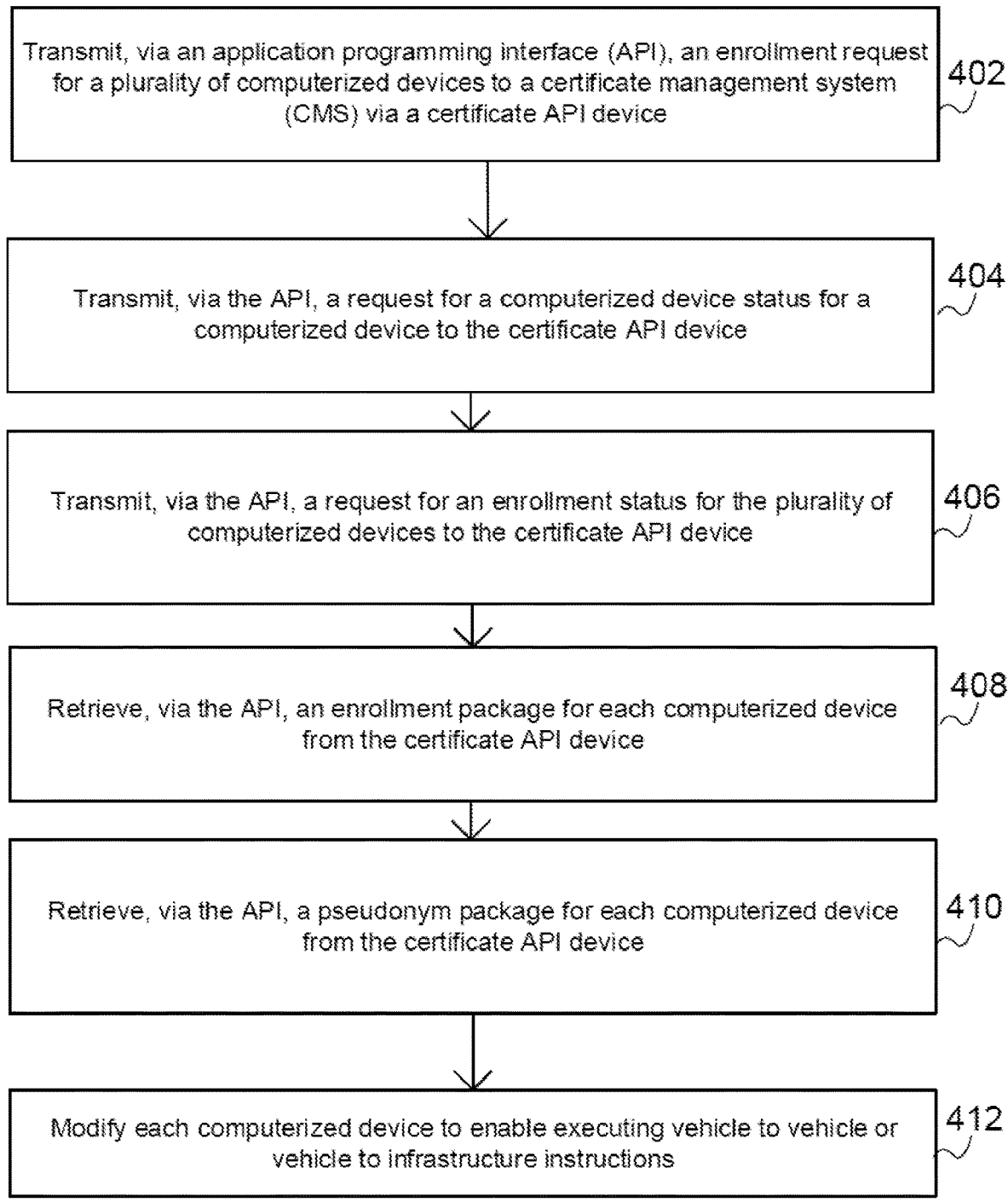
FIG. 4 is a process flow diagram of an example method for asynchronously receiving an enrollment package and a certificate package for a number of computerized devices via a client device, consistent with example embodiments described herein.

FIG. 4 is a process flow diagram of an example method for asynchronously receiving an enrollment package and an end entity package for a number of computerized devices via a client device. The method 400 can be implemented with any suitable computing device, such as client computing device 102 of FIGS. 1 and 2.

At block 402, a client device 102 can transmit, via an application programming interface (API), an enrollment request for a plurality of computerized devices 106 to a certificate API device 108. In some examples, the enrollment request is associated with at least one enrollment package and at least one end entity certificate package that enable V2X communications. In various implementations, the enrollment request can correspond to any number of computerized devices 106 in a group requesting enrollment packages and end entity certificate packages.

At block 404, the client device 102 can transmit a request, via the API, for a computerized device status for a computerized device 106. As discussed above, the computerized device status can indicate if an enrollment package or an end entity certificate package has been received from the CMS 104. In some examples, the client device 102 can transmit the request for the computerized device status to the certificate API device 108. In some embodiments, the client device 102 can also receive a response to the request, the response comprising metadata indicating whether an enrollment package or an end entity certificate package for the computerized device 106 has been received from the CMS 104.

At block 406, the client device 102 can transmit a request, via the API, an enrollment status for a group of computerized devices 106. As discussed above in block 306 of FIG. 3, the client device 102 can also receive a response to the request, wherein the response includes metadata indicating a number of certificates received for the plurality of computerized devices 106. For example, the response can include any number of received enrollment certificates, end entity certificates, and the like. In some embodiments, the metadata can also indicate if an enrollment package has been received for a computerized device 106 and/or if an end entity certificate package has been received for a computerized device 106.

At block 408, the client device 102 can retrieve, via the API, an enrollment package for each computerized device 106. In some embodiments, the enrollment package can include bootstrapping data, and bundled enrollment certificates, among others. As discussed above in relation to block 308, retrieving the enrollment package in advance can enable a client device 102 or certificate API device 108 to provision computerized devices 106 prior to installing end entity certificates that enable the execution of runtime operations related to V2X communications.

At block 410, the client device 102 can retrieve, via the API, an end entity certificate package for each computerized device 106. In some embodiments, the end entity certificate package can include any number of bundled digital certificates or end entity certificates that enable the execution of runtime instructions. In some embodiments, the end entity certificate can enable computerized devices 106 in a V2X environment to recognize and securely execute requests by non-compromised computerized devices 106.

At block 412, the client device 102 can modify each computerized device 106 to enable exchanging secure transmissions with additional computerized devices using data from the enrollment package and the end entity certificate package. For example, the client device 102 can transmit the enrollment packages and the end entity certificate packages to the computerized devices 106. Accordingly, the client device 102 can install applications, firmware, enrollment certificates, end entity certificates, and the like, on the computerized devices 106, which enables the computerized devices 106 to execute real-time instructions in a secure vehicle to vehicle or vehicle to infrastructure environment.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
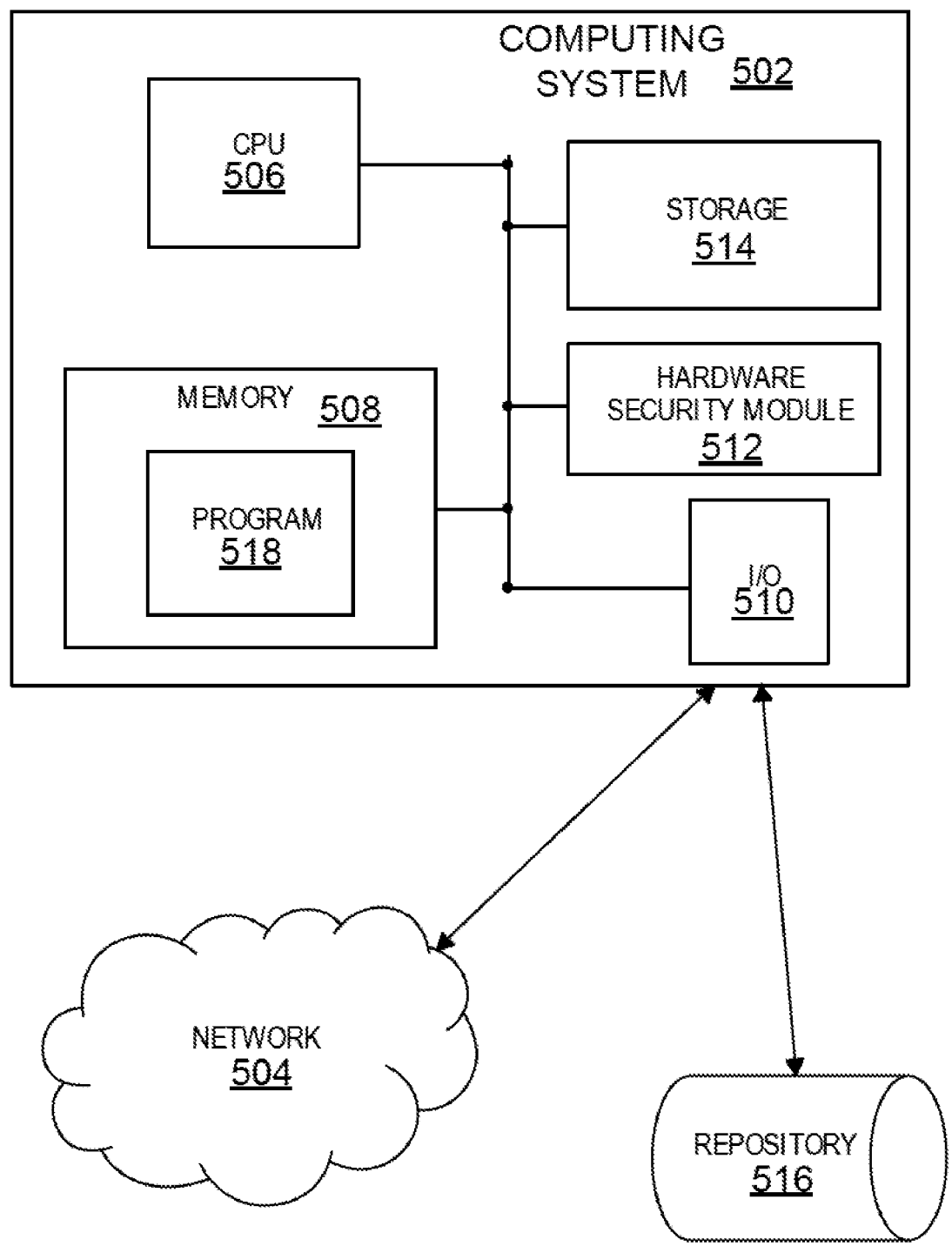
FIG. 5 is a block diagram of an example of a computing system that can host systems and methods consistent with example embodiments described herein.

FIG. 5 is a block diagram of an example of a computing environment 500, which includes a computing system 502 that may be used for implementing systems and methods consistent with implementations of the present techniques. Other components and/or arrangements may also be used. In some implementations, computing system 502 may be used to implement, at least partially, various components of FIGS. 1-2, such as the client device 102, or the certificate API device 108, among other things. In some implementations, a series of computing systems similar to computing system 500 may be each customized with specialized hardware and/or programmed as a specialized server to implement one of the components of FIGS. 1-2, which may communicate with each other via a network 504.

In the example shown in FIG. 5, the computing system 500 includes a number of components, such as a central processing unit (CPU) 506, a memory 508, an input/output (I/O) device(s) 510, a hardware security module (HSM) 512, and a nonvolatile storage device 514. System 500 can be implemented in various ways. For example, an implementation as an integrated platform (such as a server, workstation, personal computer, laptop, etc.) may comprise a CPU 506, a memory 508, a nonvolatile storage 514, and I/O devices 510. In such a configuration, the components 506, 508, 514, and 510 may connect and communicate through a local data bus and may access a data repository 516 (implemented, for example, as a separate database system) via an external I/O connection. The I/O component(s) 510 may connect to external devices through a direct communication link (e.g., a hardwired or local Wi-Fi connection), through a network, such as a local area network (LAN) or a wide area network (WAN, such as a cellular telephone network or the Internet), and/or through other suitable connections. System 500 may be standalone or it may be a subsystem of a larger system.

The CPU 506 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. The memory 508 may be one or more storage devices configured to store instructions and information executed or used by the CPU 506 to perform certain functions, methods, and processes related to implementations of the present techniques. The storage 514 may be a volatile or non-volatile, magnetic, semiconductor, tape, optical, or other type of storage device or computer-readable medium, including devices such as CDs and DVDs and solid state devices, meant for long-term storage. In some examples, the storage 514 can be any suitable non-transitory computer-readable media. For example, the non-transitory computer-readable media can include computer-executable instructions that direct the CPU 506 to execute operations that perform the techniques described herein.

In the illustrated implementation, the memory 508 contains one or more programs or applications 518 loaded from the storage 514 or from a remote system (not shown) that, when executed by the CPU 506, perform various operations, procedures, processes, or methods consistent with the present techniques. Alternatively, the CPU 506 may execute one or more programs located remotely from the system 500. For example, the system 500 may access one or more remote programs via the network 504 that, when executed, perform functions and processes related to implementations of the present techniques.

In one implementation, the memory 508 may include a program(s) 518 for performing the specialized functions and operations described herein for the client device 102, and/or the certificate API device 108. In some implementations, the memory 508 may also include other programs or applications that implement other methods and processes that provide ancillary functionality to the present techniques.

The memory 508 may be also be configured with other programs (not shown) unrelated to the present techniques and/or an operating system (not shown) that performs several functions well known in the art when executed by the CPU 506. By way of example, the operating system may be Microsoft Windows™, Unix™, Linux™ an Apple Computers™ operating system, or other operating system. The choice of operating system, and even the use of an operating system, is not critical to the present techniques.

The HSM 512 may be a device with its own processor that securely generates and stores digital security assets and/or securely performs a variety of cryptographic and sensitive computations. The HSM 512 protects digital security assets, such as cryptographic keys, and other sensitive data from possible access by an attacker. In some implementations, the HSM may be a chip, a plug-in card, or a board that attaches directly to the computing system 500.

The I/O device(s) 510 may comprise one or more input/output devices that allow data to be received and/or transmitted by the system 500. For example, the I/O device 510 may include one or more input devices, such as a keyboard, touch screen, mouse, and the like, that enable data to be input from a user. Further, the I/O device 510 may include one or more output devices, such as a display screen, a CRT monitor, an LCD monitor, a plasma display, a printer, speaker devices, and the like, that enable data to be output or presented to a user. The I/O device 510 may also include one or more digital and/or analog communication input/output devices that allow the computing system 500 to communicate, for example, digitally, with other machines and devices. Other configurations and/or numbers of input and/or output devices may be incorporated in the I/O device 510.

In the implementation shown, the system 500 is connected to a network 504 (such as the Internet, a private network, a virtual private network, a cellular network or other network or combination of these), which may in turn be connected to various systems and computing machines, such as servers, personal computers, laptop computers, client devices, etc. In general, the system 500 may input data from external machines and devices and output data to external machines and devices via the network 504.

In the example implementation shown in FIG. 5, the data repository or data source 516 is a standalone database external to system 500. In other implementations, the data source 516 may be hosted by the system 500. In various implementations, the data source 516 may manage and store data used to implement systems and methods consistent with the present techniques. For example, the data source 516 may manage and store data structures that contain the status and log information for each device 106 provisioned by the system 100, and the like.

The data source 516 may comprise one or more databases that store information and are accessed and/or managed through the system 500. By way of example, the database 516 may be an Oracle™ database, a Sybase™ database, or other relational or non-relational database. Systems and methods consistent with the present techniques, however, are not limited to separate data structures or databases, or even to the use of a database or data structure.

One of ordinary skill will recognize that the components and implementation details of the system in FIG. 5 are examples presented for conciseness and clarity of explanation. Other components and implementation details may be used.

Although the foregoing examples use specific examples of computerized devices, such as OBUs, ECUs, and RSUs, for clarity of explanation, the present techniques are not limited to those specific examples. Various implementations consistent with the present techniques may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

Other implementations of the present techniques will be apparent to those skilled in the art from consideration of the specification and practice of the techniques disclosed herein. Various modifications of the illustrative embodiments, as well as other embodiments of the subject matter that are apparent to persons skilled in the art to which the disclosed subject matter pertains, are deemed to lie within the scope of the disclosed subject matter.

What is claimed is:

1. A system for securely provisioning at least one computerized device comprising:
a certificate application programming interface (API) device that is communicatively connected to the at least one computerized device via a first secure communication channel, and that is operable to receive a digital asset and to load the digital asset into the at least one computerized device, the digital asset comprising an enrollment package and an end entity certificate package, wherein the certificate API device is also operable to:
receive, via an API, an enrollment request for the at least one computerized device, wherein the enrollment request facilitates vehicle to vehicle or vehicle to infrastructure communications;
generate, via the API, the enrollment package for the at least one computerized device by transmitting at least one enrollment certificate request to a certificate management service (CMS), which generates one or more enrollment certificates for the enrollment package;
generate, via the API, the end entity certificate package for the at least one computerized device by transmitting at least one end entity certificate request to the CMS, which generates one or more end entity certificates for the end entity certificate package; and
transmit, via the API, the enrollment package and the end entity certificate package to the at least one computerized device, wherein the enrollment package and the end entity certificate package are configured to modify the at least one computerized device, which enables the at least one computerized device to exchange secure communications with additional computerized devices,
wherein the CMS is connected via a second secure communication channel to the certificate API device, and
wherein the CMS provides the one or more enrollment certificates and the one or more end entity certificates to the certificate API device.

2. The system of claim 1, wherein the certificate API device is operable to:
receive, via the API, a request for a computerized device status for the at least one computerized device; and
transmit, via the API, a response to the request, the response comprising metadata indicating whether an enrollment certificate has been received from the CMS for the at least one computerized device.

3. The system of claim 1, wherein the certificate API device is operable to:
receive, via the API, a request for an enrollment status for a group of computerized devices; and
transmit, via the API, a response to the request, the response comprising metadata indicating a number of enrollment certificates and end entity certificates received for the group of computerized devices.

4. The system of claim 1, wherein the enrollment request comprises a computerized device identifier corresponding to an externally accessible serial number for the at least one computerized device.

5. The system of claim 1, wherein the at least one computerized device comprises an electronic control unit of an automobile.

6. The system of claim 1, wherein the certificate API device is operable to receive and archive a wrapped key for a matching enrollment package in response to detecting that one of the at least one computerized device comprises volatile memory.

7. The system of claim 6, wherein the certificate API device is operable to retrieve and transmit the wrapped key with metadata so that it is properly associated with the one of the at least one computerized device.

8. The system of claim 1, wherein the certificate API device is operable to provide the enrollment package and the end entity certificate package to the at least one computerized device without a connection to an external network.

9. The system of claim 1, wherein the at least one computerized device is a road-side unit (RSU), and wherein the certificate API device is operable to provide the enrollment package to the at least one computerized device without providing the end entity certificate package but optionally with providing application certificates.

10. The system of claim 9, wherein the road-side unit is a street light sensor or a construction warning sensor.

11. The system of claim 1, wherein the certificate API device is operable to generate the end entity certificate package by bundling one or more end entity certificates retrieved from the CMS.

12. The system of claim 1, wherein the certificate API device is operable to generate the enrollment package by bundling one or more enrollment certificates retrieved from the CMS.

13. A method for securely provisioning at least one computerized device comprising:
receiving, via an application programming interface (API), an enrollment request for at least one computerized device, wherein the enrollment request enables vehicle to vehicle or vehicle to infrastructure communications;
generating, via the API, an enrollment package, based at least on the enrollment request, for the at least one computerized device by obtaining the enrollment package from a certificate management service (CMS);
generating, via the API, an end entity certificate package for the at least one computerized device by obtaining the end entity certificate package from the CMS; and
transmitting, via the API, the enrollment package and the end entity certificate package to the at least one computerized device, the enrollment package and the end entity certificate package to modify the at least one computerized device to enable exchanging secure communications with additional computerized devices.

14. The method of claim 13, comprising:
requesting, via the API, a computerized device status for the at least one computerized device from the CMS.

15. The method of claim 13, comprising:
requesting, via the API, an enrollment status for a group of computerized devices from the CMS.

16. The method of claim 13, wherein the enrollment request comprises a computerized device identifier corresponding to an externally accessible serial number for the at least one computerized device and, if needed, an associated wrapped key and device information.

17. The method of claim 13, wherein the at least one computerized device comprises an electronic control unit of an automobile.

18. The method of claim 13, comprising:
retrieving a wrapped key in response to detecting the at least one computerized device comprises volatile memory.

19. The method of claim 18, comprising:
transmitting the wrapped key to the at least one computerized device.

20. The method of claim 13, comprising:
retrieving the enrollment package and the end entity certificate package without a connection to an external network.

21. One or more non-transitory computer-readable media comprising a plurality of computer-executable instructions for an application programming interface (API) that uses a digital asset comprising an enrollment package and an end entity certificate package, wherein the plurality of computer-executable instructions, when executed by a processor, causes the processor to:
receive, via the API, an enrollment request for at least one computerized device, wherein the enrollment request facilitates vehicle to vehicle or vehicle to infrastructure communications;
generate, via the API, the enrollment package for the at least one computerized device by transmitting at least one enrollment certificate request to a certificate management service (CMS), which generates one or more enrollment certificates for the enrollment package;
generate, via the API, the end entity certificate package for the at least one computerized device by transmitting at least one end entity certificate request to the CMS, which generates one or more end entity certificates for the end entity certificate package; and
asynchronously transmit, via the API, the enrollment package and the end entity certificate package to the at least one computerized device, wherein the enrollment package and the end entity certificate package are configured to modify the at least one computerized device, which enables the at least one computerized device to exchange secure communications with additional computerized devices.

22. The one or more non-transitory computer-readable media of claim 21, wherein the plurality of computer-executable instructions causes the processor to provide the enrollment package and the end entity certificate package to the at least one computerized device without a connection to an external network.

23. The one or more non-transitory computer-readable media of claim 21, wherein the plurality of computer-executable instructions causes the processor to:
receive, via the API, a request for a computerized device status for the at least one computerized device.

24. The one or more non-transitory computer-readable media of claim 21, wherein the plurality of computer-executable instructions causes the processor to:
receive, via the API, a request for an enrollment status for a group of computerized devices.

25. The one or more non-transitory computer-readable media of claim 21, wherein the enrollment request comprises a computerized device identifier corresponding to an externally accessible serial number for the at least one computerized device.

26. The one or more non-transitory computer-readable media of claim 21, wherein the at least one computerized device comprises an electronic control unit of an automobile.

27. The one or more non-transitory computer-readable media of claim 21, wherein the plurality of computer-executable instructions causes the processor to:
obtain a wrapped key for the at least one computerized device, which comprises volatile memory.

28. The one or more non-transitory computer-readable media of claim 27, wherein the plurality of computer-executable instructions causes the processor to:
transmit the wrapped key to the at least one computerized device.

29. The one or more non-transitory computer-readable media of claim 21, wherein the plurality of computer-executable instructions causes the processor to:
provide the enrollment package and the end entity certificate package without a connection to an external network.

30. The one or more non-transitory computer-readable media of claim 21, wherein the plurality of computer-executable instructions causes the processor to:

generate the enrollment package by bundling the one or more enrollment certificates.

\* \* \* \* \*